United States Patent
Ben Abdelaziz et al.

(10) Patent No.: US 12,455,592 B2
(45) Date of Patent: Oct. 28, 2025

(54) METHOD FOR TRANSMITTING COMPUTER CONTENT OF A COMMUNICATION TERMINAL TO A DISPLAY SCREEN ARRANGED IN A VEHICLE

(71) Applicant: FAURECIA INTERIEUR INDUSTRIE, Nanterre (FR)

(72) Inventors: Omar Ben Abdelaziz, Tille (FR); Mahdi Ben Abdallah, Paris (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 186 days.

(21) Appl. No.: 18/202,261

(22) Filed: May 25, 2023

(65) Prior Publication Data

US 2023/0384823 A1 Nov. 30, 2023

(30) Foreign Application Priority Data

May 25, 2022 (FR) ........................................ 2205074

(51) Int. Cl.
*G06F 1/16* (2006.01)
(52) U.S. Cl.
CPC ................. *G06F 1/1622* (2013.01)
(58) Field of Classification Search
CPC .... G06F 1/1622; G06F 1/1694; G06F 1/1698; G06F 3/017; G06F 3/1423; G06F 3/1454; G06F 3/0488; G06F 16/583; G06F 3/013; G09G 2370/042; G09G 2380/10; H04M 1/724098; H04M 1/72412; H04M 2250/16; H04M 1/72463; H04W 4/027;
(Continued)

(56) References Cited

U.S. PATENT DOCUMENTS

| | | | |
|---|---|---|---|
| 9,560,387 B2 | 1/2017 | Barowski | |
| 9,894,492 B1 * | 2/2018 | Elangovan | ............ H04W 4/023 |

(Continued)

FOREIGN PATENT DOCUMENTS

| | | |
|---|---|---|
| CN | 112423226 A | 2/2021 |
| WO | 2017075386 A1 | 5/2017 |

OTHER PUBLICATIONS

French Search Report corresponding to French application FR 2205074, dated Nov. 18, 2022, 9 pages.

*Primary Examiner* — Richard J Hong
(74) *Attorney, Agent, or Firm* — Reising Ethington P.C.

(57) ABSTRACT

A method for transmitting computer content of a transmitting communication terminal to a display screen arranged in a passenger compartment of a vehicle. The method includes the following steps: a) determining the identifications of the zones wherein the transmitting communication terminal and a destination communication terminal are located, b) coupling the transmitting communication terminal to a display screen, c) storing an identification of the transmitting communication terminal and an identification of the destination communication terminal according to the coupling step, d) generating a request to transmit computer content to the destination communication terminal, e) determining the identification of the display screen located in the zone wherein the destination terminal is located, and f) transmitting the computer content to the display screen coupled to the destination communication terminal.

7 Claims, 4 Drawing Sheets

(58) Field of Classification Search
CPC ......... H04W 4/48; H04W 4/80; H04W 4/029; H04W 4/023; H04N 21/4622; H04B 17/318; B60R 25/245; B60R 21/0152; H04L 67/306; B60N 2/0273
See application file for complete search history.

(56) References Cited

U.S. PATENT DOCUMENTS

| | | |
|---|---|---|
| 10,938,971 B2 | 3/2021 | Sasaki |
| 2011/0270492 A1* | 11/2011 | Hwang ............... B60R 21/0152 177/136 |
| 2012/0149341 A1* | 6/2012 | Tadayon ............... H04W 4/029 455/412.1 |
| 2014/0309871 A1* | 10/2014 | Ricci .................... G06F 16/583 701/36 |
| 2015/0015479 A1* | 1/2015 | Cho ........................ G06F 3/013 345/156 |
| 2015/0271561 A1* | 9/2015 | Park ................... H04N 21/4622 725/59 |
| 2017/0054842 A1* | 2/2017 | Choi ................. H04M 1/72463 |
| 2017/0105101 A1* | 4/2017 | Santavicca ........... H04B 17/318 |
| 2018/0088777 A1* | 3/2018 | Dazé ..................... G06F 3/0488 |
| 2018/0257658 A1* | 9/2018 | Cho ..................... H04L 67/306 |
| 2019/0308614 A1* | 10/2019 | Lavoie ................. B60R 25/245 |
| 2020/0070839 A1* | 3/2020 | Cho ..................... B60N 2/0273 |
| 2021/0127233 A1 | 4/2021 | Santavicca et al. |

* cited by examiner

METHOD FOR TRANSMITTING COMPUTER CONTENT OF A COMMUNICATION TERMINAL TO A DISPLAY SCREEN ARRANGED IN A VEHICLE

TECHNICAL FIELD

The present invention relates to a method for transmitting computer content of a transmitting communication terminal to a display screen arranged in a passenger compartment of a vehicle and its associated vehicle.

BACKGROUND

It is possible to share computer content with occupants of a vehicle using the "Bluetooth" communication protocol or the "AirDrop" registered trademark feature. This feature makes it possible to discover smart phones in the vicinity of your device, select the person's smartphone to whom you want to transmit computer content and send this IT content. It is also possible to transmit computer content using the Internet communication network. In all cases, this sharing requires several steps which may become tedious.

A first object of the present invention is to propose a fast and simple method for sharing computer content with one or more occupant(s) of a vehicle.

A second object of the present invention is to propose a method for sharing computer content while guaranteeing its confidentiality inside the passenger compartment of a vehicle.

SUMMARY

The present invention relates to a method for transmitting computer content from a transmitting communication terminal to at least one display screen arranged in a passenger compartment of a vehicle, the method being implemented by a transmission system comprising at least a first and a second display screen, at least a first and a second ultra-wideband positioning anchor, a transmitting communication terminal comprising a memory storing at least one item of computer content, at least one destination communication terminal, a processing unit and a memory said transmitting communication terminal and said at least one destination communication terminal each comprising an ultra-wideband element, the method comprising the following steps:
a) determining the identifications of the zones wherein the transmitting communication terminal and the destination communication terminal are located,
b) coupling the transmitting communication terminal to a display screen and coupling the destination communication terminal to another display screen,
c) storing an identification of the transmitting communication terminal and an identification of the destination communication terminal according to the coupling step,
d) generating a request to transmit computer content to said at least one destination communication terminal by the transmitting communication terminal,
e) determining the identification of the display screen located in the zone wherein the destination terminal is located,
f) transmitting the computer content to the display screen coupled to the destination communication terminal.

Advantageously, this method allows more intuitive and more user-friendly data transferring for the user of the transmitting terminal.

Advantageously, this computer content transfer method is simple and fast.

Advantageously, the use of this method allows greater comfort for playing the computer content for the user of the destination terminal.

The features disclosed in the following paragraphs may optionally be implemented. They can be implemented independently of one another or in combination with one another:

The transmitting communication terminal comprises a movement detection device, and wherein the generating of the request to transmit computer content is implemented by moving the transmitting communication terminal according to a defined movement, said defined movement being a function of the relative position of the transmitting communication terminal with respect to the zone wherein the destination communication terminal is located.

The defined movement for transferring computer content to a display screen coupled to a zone in front of the transmitting communication terminal is performed by:
 positioning in a horizontal initial position followed by
 a first rotation of the transmitting communication terminal about a transverse axis of the vehicle by an angle of between 20° and 90° in a given direction,
 a second rotation of the transmitting communication terminal in order to return to the initial horizontal position, and
 repeating the first and second rotations.

The defined movement for transferring computer content to a display screen coupled to a zone behind the transmitting communication terminal is performed by:
 positioning in a vertical initial position followed by
 a first rotation of the transmitting communication terminal about a transverse axis by an angle of between 20° and 90° in a given direction,
 a second rotation of the transmitting communication terminal in a reverse direction to return to the vertical initial position, and
 repeating the first and second rotations.

The movement defined to transfer computer content to a display screen coupled to a zone located to the right of the transmitting communication terminal is implemented by rotating the transmitting communication terminal around a longitudinal axis in a clockwise direction by an angle of between 20° and 90° from an initial horizontal position, rotating the transmitting communication terminal a second time in a counterclockwise direction to return to the initial position, and repeating the first and second rotations.

The defined movement for transferring computer content to a display screen coupled to a zone to the left of the transmitting communication terminal is performed by:
 positioning in a horizontal initial position followed by
 a first rotation of the transmitting communication terminal counterclockwise around a longitudinal axis by an angle of between 20° and 90°,
 a second rotation of the transmitting communication terminal clockwise to return to the horizontal initial position, and
 repeating the first and second rotations.

The first and second display screens are touch screens, and wherein the method further comprises the following step; said steps being implemented after the step of determining the identification of the display screen:

displaying a visualization window containing a request to share computer content on the identified display screen, generating a response by contact with the display screen and transmitting said response to the transmitting communication terminal, said response being an acceptance or refusal of receiving the computer content.

Steps a) and b) are repeated at a defined frequency, for example a frequency of between 100 milliseconds and 1 second.

Advantageously, the computer content will be transferred to the screen placed facing the recipient even if that person changes seats during the trip. The invention also relates to a vehicle comprising a passenger compartment divided into at least one first zone and a second zone, and a transmission system comprising:

at least a first display screen located in the first zone and a second display screen located in the second zone, at least a first and a second and a third ultra-wideband positioning anchor configured to emit in the passenger compartment, a transmitting communication terminal carrying an ultra-wideband element, and comprising a memory storing at least one item of computer content, at least one destination communication terminal carrying an ultra-wideband element, and a processing unit configured to communicate with the first positioning anchor, the second positioning anchor and the third positioning anchor, the first display screen, the second display screen and the transmitting communication terminal, and the transmitting communication terminal and the destination communication terminal being positioned in the passenger compartment, the transmitting communication terminal and the processing unit being configured to implement the steps of the method mentioned above.

The vehicle further comprises a database storing at least one identification of the first zone associated with an identification of the first display screen and an identification of the second zone associated with an identification of the second display screen.

The vehicle further comprises a memory storing a map defining the positioning of the first zone and the second zone.

DETAILED DESCRIPTION

In the present patent application, in the longitudinal direction X, a horizontal direction is understood to extend between the front and the rear of the vehicle seat. The transverse direction Y refers to a horizontal direction, extending from one side of the vehicle seat to the other side of the vehicle seat. The vertical direction Z means the direction perpendicular to the longitudinal X and transverse Y directions.

Figure 1:
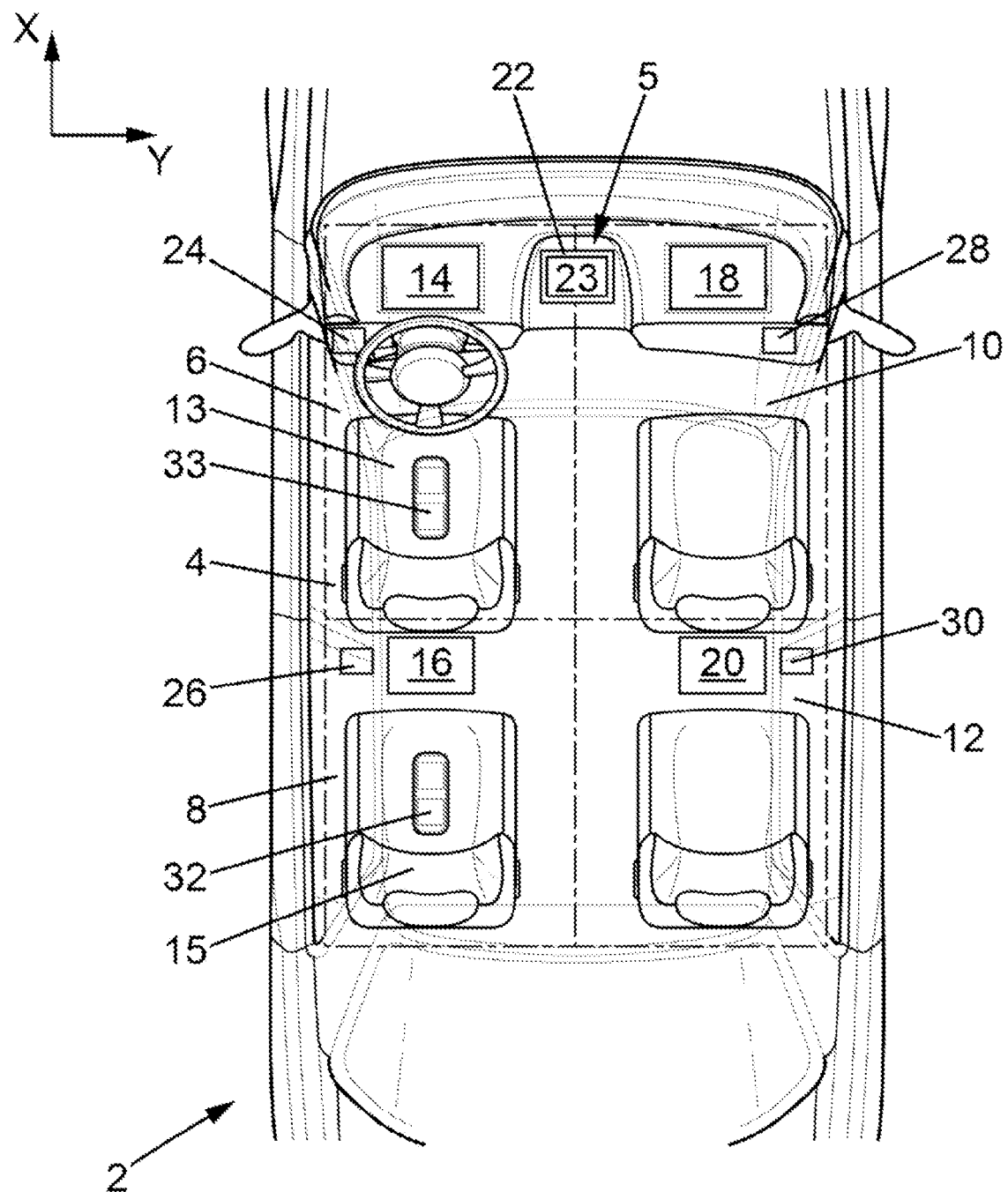
FIG. 1 is a schematic top view of a vehicle according to an embodiment of the present invention.

In the embodiment shown in FIG. 1 by way of example, the vehicle 2 comprises a body delimiting an inner passenger compartment 4 and a transmission system 5 mounted in the passenger compartment.

The passenger compartment 4 is divided into a first zone 6, a second zone 8, a third zone 10 and a fourth zone 12. Each zone generally corresponds to the location of a seat and to its close environment. Thus, for example, the first zone 6 comprises and surrounds the front driver's seat 13. The second zone 8 comprises and surrounds a rear seat 15 located behind the front driver's seat 13.

The transmission system 5 comprises a first display screen 14 arranged in the first zone 6, a second display screen 16 arranged in the second zone 8, a third display screen 18 arranged in the third zone 10, a fourth display screen 20 arranged in the fourth zone 12.

Preferably, the first display screen 14, the second display screen 16, the third display screen 18 and the fourth display screen 20 are touch screens.

The transmission system 5 further comprises a processing unit 22 configured to exchange data with the display screens 14, 16, 18, 20. The processing unit 22 can be connected by wired or wireless connection to the display screens 14, 16, 18, 20.

The processing unit 22 of the communication terminal consists of a processor or a microprocessor. The processing unit 22 may for example be the electronic control unit of the vehicle, generally called an ECU unit.

The processing unit comprises a memory 23. The memory 23 stores a program for implementing the transmission method described below and a database storing an identification of each display screen associated with, that is linked to, an identification of the zone wherein the respective display screen is located.

Thus, the database comprises a first identification ID1 of the first display screen 14 associated with an identification Z1 of the first zone 6; the first zone being the zone wherein the first display screen is located. In the same way, the database of the memory 23 stores:

a second identification ID2 of the second display screen 16 associated with an identification Z2 of the second zone 8;

a third identification ID3 of the third display screen 18 associated with an identification Z3 of the third zone 10;

a fourth identification ID4 of the fourth display screen 20 associated with an identification Z4 of the fourth zone 12. Advantageously, the memory 23 also stores a map of the positioning of the zones relative to one another.

The transmission system 5 further comprises a first positioning anchor 24 with ultra-wideband configured to emit in the passenger compartment 4, and in particular in the first zone 6, a second positioning anchor 26 with ultra-wideband configured to emit in the passenger compartment 4, and in particular in the second zone 8, a third positioning anchor 28 with ultra-wideband configured to emit in the passenger compartment 4, and in particular in the third zone 10, a fourth positioning anchor 30 with ultra-wideband configured to emit in the passenger compartment 4, and in particular in the fourth zone 12.

The positioning anchors 24 to 30 are configured to detect ultra-wideband elements, as described subsequently. The positioning anchors 24 to 30 are also configured to exchange data with the processing unit 22. For this purpose, they are connected thereto by a wired or wireless connection.

The transmission system 5 comprises a first communication terminal 32 and a second communication terminal 33.

Figure 2:
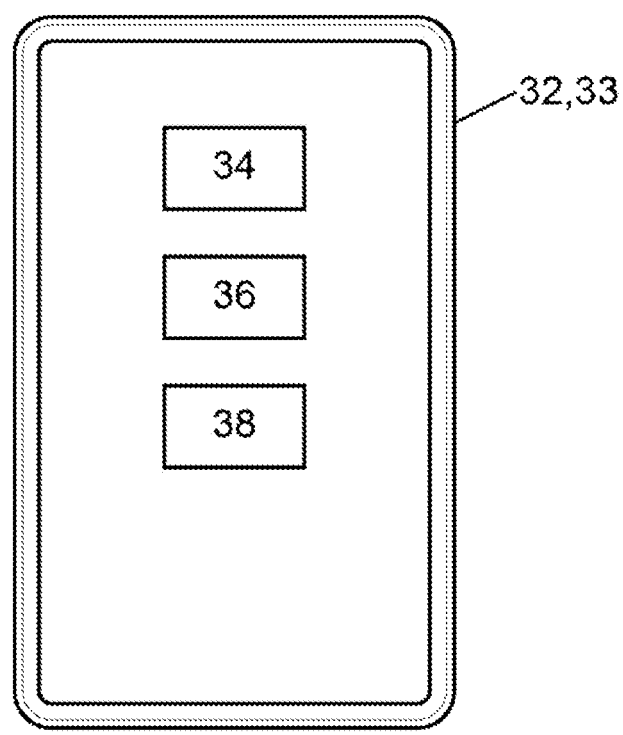
FIG. 2 is a schematic front view of example communication terminals used in conjunction with the method of the invention.

With reference to FIG. 2, the first communication terminal 32 and the second communication terminal 33 are mobile objects. For example, they consist of smartphones or tablets. They conventionally comprise a processor or a microprocessor, a memory 34, a SIM card, USIM, or a microSIM card, a view screen, an interface for communicating with the processing unit 22 of the vehicle and an interface for communication with an Internet network or a communication network, such as a mobile network GSM, UMTS, 3G, 4G, 5G, etc.

The memory 34 of the communication terminal comprises a random access memory, denoted RAM and a read-only memory, denoted ROM. The memory is capable of storing at least one computer content and programs for implementing the transmission method described below.

Computer content may for example be audio content of audio or video type, a hypertext link, a text file, a table etc.

The first communication terminal 32 and the second communication terminal 33 also include an ultra-wideband element 36 and a movement detection device 38.

The ultra-wideband element 36 is for example constituted by an antenna and smart electronic unit such as for example a microprocessor and optionally a battery. The ultra-wideband element 36 comprises a specific identifier linked to the communication terminal that carries it. This specific identifier is stored in the read-only memory of the telephone.

In particular, the positioning anchors 24, 26, 28 and 30 are capable of detecting the presence of the ultra-wideband element 36. For this purpose, each positioning anchor 24, 26, 28 and 30 communicates to the processing unit 22 the distance between it and the ultra-wideband element 36. The processing unit is configured to calculate the position of the ultra-wideband element 36 by simple or complex triangulation In addition, each positioning anchor 24 is designed to determine which communication terminal is located in the zone that it covers based on its specific identifier.

The movement detection device 38 is adapted to detect the movements of the communication terminal. It comprises for example a gyrometer.

Alternatively, the vehicle comprises a different number of zones and positioning anchors. Thus, the vehicle may comprise two zones and two positioning anchors or three zones and three positioning anchors.

The transmission method according to an embodiment of the present invention is now described in connection with FIGS. 1, 3 and 4.

During a step 40, the method determines identifications of the zones where the transmitting communication terminal 32 and the destination communication terminal 33 are located.

During a step 41, the method couples the transmitting communication terminal 32 to display screen 16 that is in the zone where the terminal 32 is located and couples the destination communication terminal 33 to display screen 14 that is in the zone where the terminal 33 is located.

During a step 42, the processing unit 22 records, in the database of the memory 23, the specific identifier of the communication terminals 32, 33 coupled to the identifier of the zones wherein the communication terminals are located.

During a step 44, a request to transmit computer content is generated by a communication terminal called the transmitter to a communication terminal called the destination. In particular, this transmission request is generated by the movement detection device 38 of the transmitting communication terminal detecting a defined movement or a defined sequence of movements of the transmitting communication terminal.

In order to simplify the description, a specific movement or a sequence of movements are called "defined movement" hereinafter. This defined movement varies as a function of the relative position of the transmitting communication terminal 32 relative to the zone wherein the destination communications terminal 33 is located.

Figure 3:
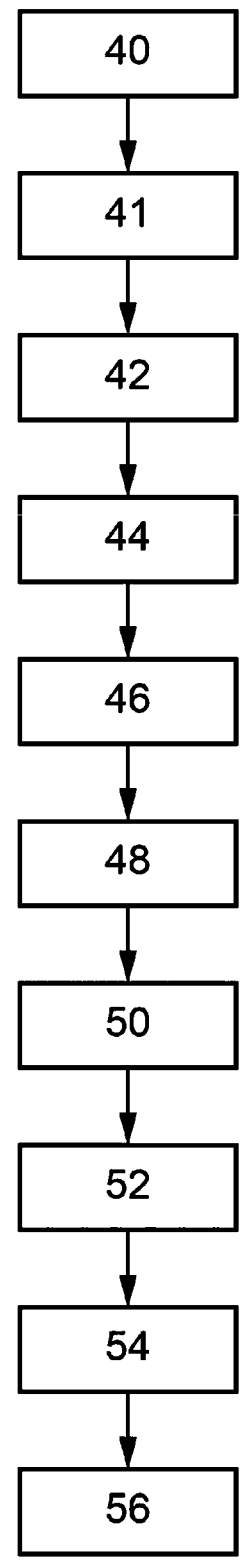
FIG. 3 is a diagram representing the steps of the transmission method according to an embodiment of the invention.

For example, in the example shown in FIGS. 1 and 3, the first communication terminal 32 is the transmitting communication terminal and the second communication terminal 33 is the destination communication terminal. The destination communication terminal 33 is here located in the first zone 6 and the transmitting communication terminal 32 is located in the second zone 8. The destination communication terminal 33 is therefore located in a zone located in front of the transmitting communication terminal 32.

Figure 4:
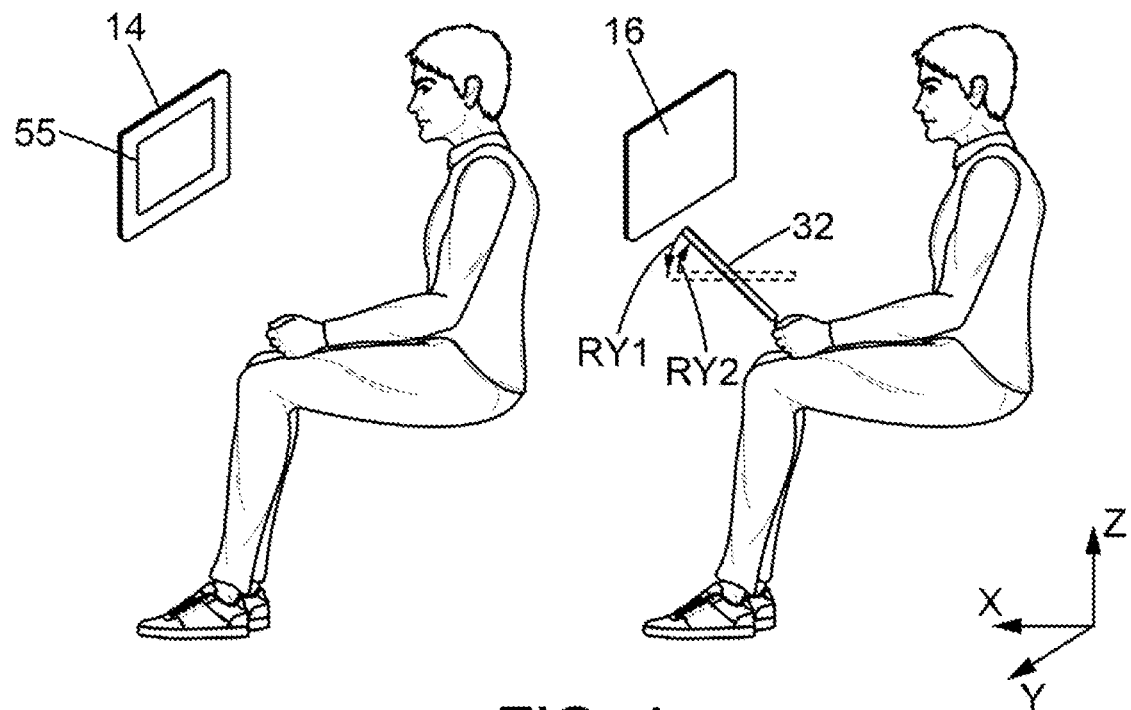
FIG. 4 is a schematic side view representing an occupant of the vehicle generating a request for transmission of computer content to a front zone.

As shown in FIG. 4, the defined movement making it possible to transfer computer content to a display screen coupled to a zone located in front of the transmitting communication terminal 32 is implemented by positioning the transmitting communication terminal 32 in a horizontal initial position, followed by a first rotation RY1 followed by a second rotation RY2 of the transmitting communication terminal 32 making it possible to return to the initial horizontal position, then a repetition of the first rotation RY1 and the second rotation RY2.

In the initial horizontal position, the transmitting communication terminal 32 is contained in a horizontal plane (X, Y)

The first rotation RY1 and the second rotation RY2 are carried out around the same axis directed in the transverse direction Y of the vehicle by a substantially identical angle. This angle is between 20° and 90°, preferably between 30° and 60°.

The first rotation RY1 is carried out in a given direction, for example a counterclockwise direction. The second rotation RY2 is carried out in one opposite direction, for example a clockwise direction.

We will also describe examples of defined movement making it possible to transfer computer content to other zones.

Figure 5:
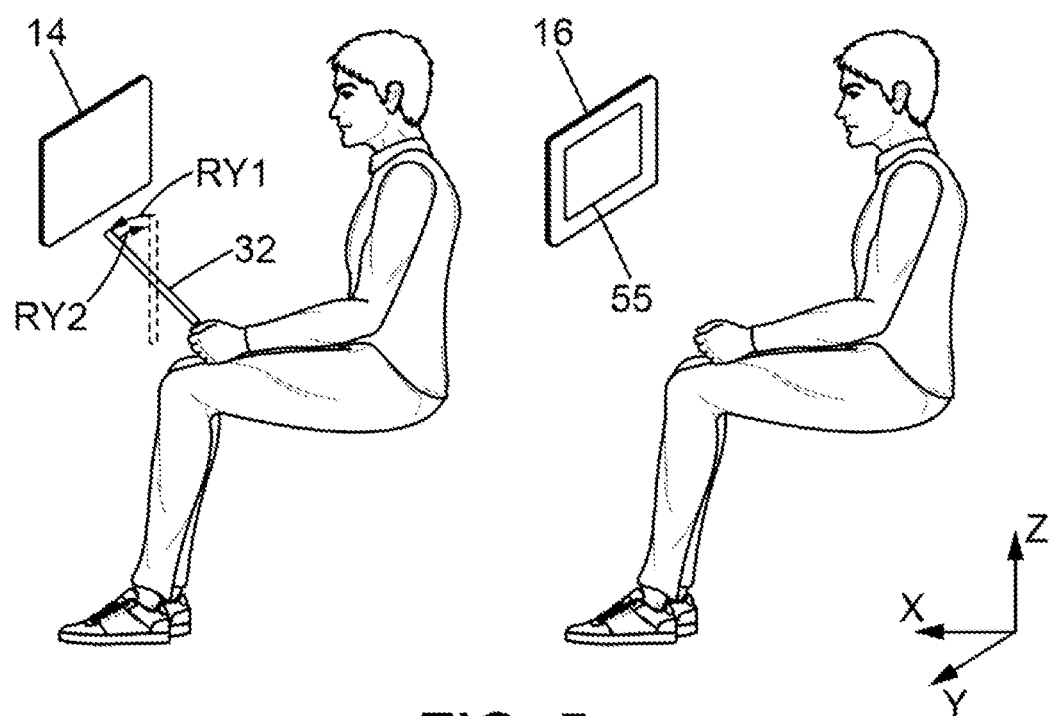
FIG. 5 is a schematic side view representing an occupant of the vehicle generating a request for transmission of computer content to a rear zone.

Thus, with reference to FIG. 5, the defined movement making it possible to transfer computer content to a display screen coupled to a zone located behind the transmitting communication terminal 32 is implemented by positioning the transmitting communication terminal in a vertical initial position, followed by a first rotation RY1, followed by a second rotation RY2 to return to the vertical initial position and a repetition of the first and second rotation.

In the initial vertical position, the transmitting communication terminal 32 is contained in a vertical plane (Y, Z).

The first rotation RY1 and the second rotation RY2 are identical or similar to the first rotation and the second rotation described above.

The movement defined for transferring computer content to a display screen coupled to a zone located on the right of the transmitting communication terminal is implemented by positioning the transmitting communication terminal in a horizontal initial position, followed by a first rotation RZ1 of the transmitting communication terminal in a clockwise direction, a second rotation RZ2 of the transmitting communication terminal 32 in a counterclockwise direction to return to this the horizontal initial position, and a repetition of the first and second rotation.

The first rotation RZ1 and the second rotation RZ2 are carried out around the same axis directed in the vertical direction Z of the vehicle by a substantially identical angle. This angle is between 20° and 90°, preferably between 30° and 60°.

Finally, the defined movement for transferring computer content to a display screen coupled to a zone to the left of the transmitting communication terminal is performed by:
positioning in a horizontal initial position followed by
a first rotation RZ1 of the transmitting communication terminal counterclockwise around a vertical axis Z by an angle of between 20° and 90°,
a second rotation RZ2 of the transmitting communication terminal clockwise to return to the horizontal initial position, and
repeating the first and second rotations.

The first rotation RZ1 and the second rotation RZ2 are carried out around the same axis directed in the vertical direction Z.

After detection of a defined movement as described above by the movement detection device 38, the method continues with a step 46 during which the processor of the transmitting communication terminal 32 transmits information relating to this movement defined to the processing unit 22.

Then, during a step 48, this defined movement is interpreted as a request to transmit computer content to a zone located at the front, at the rear, to the right or to the left of the zone containing the transmitting communication terminal 3 according to the defined movement detected. This interpretation is carried out either by the transmitting communication terminal 32 before step 46 or by the processing unit 22 after step 46.

During a step 50, the processing unit 22 determines using its database the identification of the zone wherein the transmitting communication terminal is located, the identification of the zone located in front of the zone wherein the transmitting communication terminal is located, and the identification of the display screen associated with the identification of this last zone. In the example shown in FIGS. 1 and 4, the processing unit 22 determines that the identification Z2 of the second zone containing the transmitting communication terminal, the identification Z1 of the first zone located in front of the second zone, and the identification of the first display screen 14 associated with the identification Z1 of the first zone. Preferably, the processing unit can also use the map recorded in the memory 23 for this purpose During a step 52, a visualization window 55 containing a request to share computer content is displayed on the display screen identified during step 50.

During a step 54, the occupant of the seat located in the first zone 6 transmits a response to the transmitting communication terminal 32. This response is an acceptance or refusal to receive the computer content.

This response is for example generated by contact with the first display screen 14. This response is transmitted from the first display screen 14 to the processing unit 22. The processing unit 22 transmits this response to the transmitting communication terminal 32

Then, if this response is an acceptance, during a step 56, the computer content is transmitted from the transmitting communication terminal to the display screen identified during step 50. This transmission is implemented using the Wi-Fi protocol or the Bluetooth protocol.

Preferably, the determination 40 and memorization 42 steps are repeated at a defined frequency, for example a frequency of between 100 milliseconds and 1 second.

Advantageously, with this implementation, the computer content will be transferred to the screen placed facing the recipient even if that person changes seats during the trip.

The invention claimed is:

1. A method for transmitting computer content from a transmitting communication terminal to at least one display screen arranged in a passenger compartment of a vehicle, the method being implemented by a transmission system comprising at least two display screens located in respective different zones of the passenger compartment, at least two ultra-wideband positioning anchors, a transmitting communication terminal comprising a memory storing at least one item of computer content, a destination communication terminal, a processing unit, and a memory, said transmitting communication terminal and said at least one destination communication terminal each comprising an ultra-wideband element, the method comprising the following steps:
a) determining identifications of the zones where the transmitting communication terminal and the destination communication terminal are located,
b) storing an identification of the transmitting communication terminal and an identification of the destination communication terminal in association with the identifications of the respective zones in which the communication terminals are located,
c) generating a request to transmit computer content to said at least one destination communication terminal by the transmitting communication terminal,
d) identifying the display screen located in the zone where the destination communication terminal is located, and
e) transmitting the computer content to the identified display screen;
wherein the transmitting communication terminal comprises a movement detection device, and wherein the generating of the request to transmit computer content is carried out in response to a defined movement of the transmitting communication terminal, said defined movement being a function of the relative position of the transmitting communication terminal with respect to the zone in which the destination communication terminal is located,
and wherein the defined movement for transferring computer content to a display screen coupled to a zone in front of the transmitting communication terminal is performed by:
positioning the transmitting communication terminal in a horizontal initial position followed by:
a first rotation of the transmitting communication terminal about a transverse axis of the vehicle by an angle of between 20° and 90° in a given direction,
a second rotation of the transmitting communication terminal in order to return to the initial horizontal position, and
repeating the first and second rotations.

2. The transmission method according to claim 1, wherein the first and second display screens are touch screens, and wherein the method further comprises the following steps, said steps being implemented after step (d):
displaying a visualization window containing a request to share computer content on the identified display screen, and
generating a response by contact with the identified display screen and transmitting said response to the transmitting communication terminal, said response being an acceptance or refusal of receiving the computer content.

3. The transmission method according to claim 1, wherein steps a) and b) are repeated at a specified frequency.

4. The transmission method according to claim 3, wherein the specified frequency is between 100 milliseconds and 1 second.

5. The transmission method according to claim 1, further comprising coupling the destination communication terminal to the identified display screen and coupling the transmitting communication terminal to another of the display screens.

6. A method for transmitting computer content from a transmitting communication terminal to at least one display screen arranged in a passenger compartment of a vehicle, the method being implemented by a transmission system comprising at least two display screens located in respective different zones of the passenger compartment, at least two ultra-wideband positioning anchors, a transmitting communication terminal comprising a memory storing at least one item of computer content, a destination communication terminal, a processing unit, and a memory, said transmitting communication terminal and said at least one destination communication terminal each comprising an ultra-wideband element, the method comprising the following steps:
   a) determining identifications of the zones where the transmitting communication terminal and the destination communication terminal are located,
   b) storing an identification of the transmitting communication terminal and an identification of the destination communication terminal in association with the identifications of the respective zones in which the communication terminals are located,
   c) generating a request to transmit computer content to said at least one destination communication terminal by the transmitting communication terminal,
   d) identifying the display screen located in the zone where the destination communication terminal is located, and
   e) transmitting the computer content to the identified display screen;
   wherein the transmitting communication terminal comprises a movement detection device, and wherein the generating of the request to transmit computer content is carried out in response to a defined movement of the transmitting communication terminal, said defined movement being a function of the relative position of the transmitting communication terminal with respect to the zone in which the destination communication terminal is located,
   wherein the defined movement for transferring computer content to a display screen coupled to a zone behind the transmitting communication terminal is performed by:
   positioning in a vertical initial position followed by:
      a first rotation of the transmitting communication terminal about a transverse axis by an angle of between 20° and 90° in a given direction,
      a second rotation of the transmitting communication terminal in a reverse direction to return to the vertical initial position, and
   repeating the first and second rotations.

7. Method for transmitting computer content from a transmitting communication terminal to at least one display screen arranged in a passenger compartment of a vehicle, the method being implemented by a transmission system comprising at least two display screens located in respective different zones of the passenger compartment, at least two ultra-wideband positioning anchors, a transmitting communication terminal comprising a memory storing at least one item of computer content, a destination communication terminal, a processing unit, and a memory, said transmitting communication terminal and said at least one destination communication terminal each comprising an ultra-wideband element, the method comprising the following steps:
   a) determining identifications of the zones where the transmitting communication terminal and the destination communication terminal are located,
   b) storing an identification of the transmitting communication terminal and an identification of the destination communication terminal in association with the identifications of the respective zones in which the communication terminals are located,
   c) generating a request to transmit computer content to said at least one destination communication terminal by the transmitting communication terminal,
   d) identifying the display screen located in the zone where the destination communication terminal is located, and
   e) transmitting the computer content to the identified display screen;
   wherein the transmitting communication terminal comprises a movement detection device, and wherein the generating of the request to transmit computer content is carried out in response to a defined movement of the transmitting communication terminal, said defined movement being a function of the relative position of the transmitting communication terminal with respect to the zone in which the destination communication terminal is located,
   wherein the movement defined to transfer computer content to a display screen coupled to a zone located to the right of the transmitting communication terminal is implemented by a first rotation of the transmitting communication terminal around a vertical axis in a clockwise direction by an angle of between 20° and 90° from an initial horizontal position, a second rotation of the transmitting communication terminal a second time in a counterclockwise direction to return to the initial position, and repeating the first and second rotations.

\* \* \* \* \*